United States Patent
Rösseler et al.

(10) Patent No.: US 11,300,174 B2
(45) Date of Patent: Apr. 12, 2022

(54) DAMPING VALVE DEVICE FOR A VIBRATION DAMPER

(71) Applicant: ZF FRIEDRICHSHAFEN AG, Friedrichshafen (DE)

(72) Inventors: Jörg Rösseler, Ruppichteroth (DE); Aleksandar Knezevic, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/064,765

(22) Filed: Oct. 7, 2020

(65) Prior Publication Data
US 2021/0108697 A1    Apr. 15, 2021

(30) Foreign Application Priority Data
Oct. 10, 2019   (DE) .................. 10 2019 215 556.1

(51) Int. Cl.
*F16F 9/348*    (2006.01)
*F16F 9/19*    (2006.01)

(52) U.S. Cl.
CPC .............. *F16F 9/3485* (2013.01); *F16F 9/19* (2013.01); *F16F 2222/123* (2013.01); *F16F 2228/004* (2013.01)

(58) Field of Classification Search
CPC ........ F16F 9/512; F16F 9/3481; F16F 9/3482; F16F 9/3485; F16F 9/3487; F16F 9/5126; F16F 2222/123; F16F 2228/004; F16F 2228/066; F16F 2228/14; F16F 9/34; F16F 9/3207; F16F 9/3214; F16F 9/3221; F16F 9/3271; F16F 9/3405; F16F 2226/02; F16F 2226/026; F16F 2226/04

USPC .......................................................... 188/266
See application file for complete search history.

(56) References Cited

U.S. PATENT DOCUMENTS

| 6,129,343 | A | * | 10/2000 | Ecarnot | F16F 9/0209 |
| | | | | | 188/322.22 |
| 2003/0006539 | A1 | * | 1/2003 | Bertram | F16F 9/368 |
| | | | | | 267/120 |
| 2004/0251099 | A1 | * | 12/2004 | Papp | F16F 9/3485 |
| | | | | | 188/322.15 |
| 2019/0128361 | A1 | * | 5/2019 | Rösseler | F16F 9/512 |

FOREIGN PATENT DOCUMENTS

| DE | 1027478 | 4/1958 |
| DE | 102016210790 | 12/2017 |
| JP | 2006266290 | 10/2006 |

OTHER PUBLICATIONS

English machined translation of JP-2006-266290 A (Oct. 5, 2006).*
Office Action for the corresponding German Patent Application No. 10 2019 215 556.1.

* cited by examiner

*Primary Examiner* — Robert A. Siconolfi
*Assistant Examiner* — San M Aung
(74) *Attorney, Agent, or Firm* — Cozen O'Connor

(57) ABSTRACT

A damping valve device having a support with a circumferential groove in which a radially expandable annular element together with a flow surface forms a restriction, which restriction transitions from an open position to a restriction position depending on the flow velocity of a damping medium, and the maximum expansion position of the annular element is determined/limited by a stop. The annular element moves in direction of the open position with a delay when the flow velocity decreases by means of a dead time element.

15 Claims, 5 Drawing Sheets

DAMPING VALVE DEVICE FOR A VIBRATION DAMPER

BACKGROUND OF INVENTION

1. Field of the Invention

The invention is directed to a damping valve device for a vibration damper.

2. Description of Related Art

A damping valve for a vibration damper in which a radially expandable annular element forms a restriction that transitions from an open position into a closed position with increasing flow velocity is known from DE 10 2016 210 790 A1. There is still a residual cross section as a restriction cross section in the closed position also. Depending on the design layout of the damping valve, a limiting ring may determine a maximum expansion position. Alternatively, the limiting ring can have a profile on its outer lateral surface so that the annular element can then contact a flow guiding surface and the profile defines the residual cross section.

A radially expandable annular element in an annular groove of a piston is known from DE 1 027 478 A1, which radially expandable annular element has a supporting ring contacted by the annular element at maximum expansion.

SUMMARY OF THE INVENTION

It is the object of one aspect of the present invention to further improve damping force behaviors of the damping valve.

According to one aspect of the invention, the annular element moves in direction of the open position with a delay when the flow velocity decreases by a dead time element.

Experiments have shown that not only the adoption of a defined restriction cross section but also the damping valve operating behavior after the decay of an excitation are important for the optimal functioning of the damping valve. The damping force characteristic of the damping valve is maintained at a high damping force level temporarily with the dead time element. This minimizes an after-oscillation.

In this regard, it is provided that a positive engagement connection is closable as dead time element between the annular element and a support-side element. The disengagement time of the positive engagement connection is the time during which the damping valve stays in the harder damping force position.

In a further advantageous configuration of one aspect of the invention, a rear surface of the annular element that is acted upon by pressure has a profile, which causes an axial force component on the annular element in addition to a radial force component. The annular element is subject not only to a negative pressure force providing for the radial expansion movement but also to a pressure via a bypass channel into the annular groove. The operating behavior of the annular element 35 can be adapted to requirements by coordinating these two influencing variables, i.e., the restriction cross section in the initial state and the dimensioning of the bypass.

For on-demand functioning of the annular element 35, the annular element executes an axial movement for closing the positive engagement connection. Accordingly, the annular element executes two operating movements which can be influenced separately.

Optionally, the support-side portion of the positive engagement connection can be formed by an independent component part. This construction is relevant particularly if the support is to be produced, e.g., by sintering and undercuts in the annular groove are therefore difficult to implement.

In a further advantageous configuration, the positive engagement connection can be carried out in multiple steps so that the dead time increases over the connection depth of the positive engagement connection with increasing restriction function.

According to one aspect of the invention, at least one return spring preloads the annular element out of the positive engagement connection. Accordingly, the return movement of the annular element 35 from the positive engagement connection is defined in order, for example, to overcome the adhesion forces between the support and the annular element.

It can also be provided that at least one radial outer surface of the support forms the positive engagement connection with at least one axial projection of the annular element 35. The advantage consists in that the annular groove in the support can have a very simple contour for the positive engagement connection that can be produced in a particularly simple manner by sintering.

In addition to being radially expandable, the annular element is formed to be axially elastic to allow a further parameter to be used for dimensioning the dead time via the positive engagement connection.

BRIEF DESCRIPTION OF THE DRAWINGS

The invention will be described in more detail referring to the following description of the diagrams. The drawings show.

DETAILED DESCRIPTION OF THE PRESENTLY PREFERRED EMBODIMENTS

Figure 1:
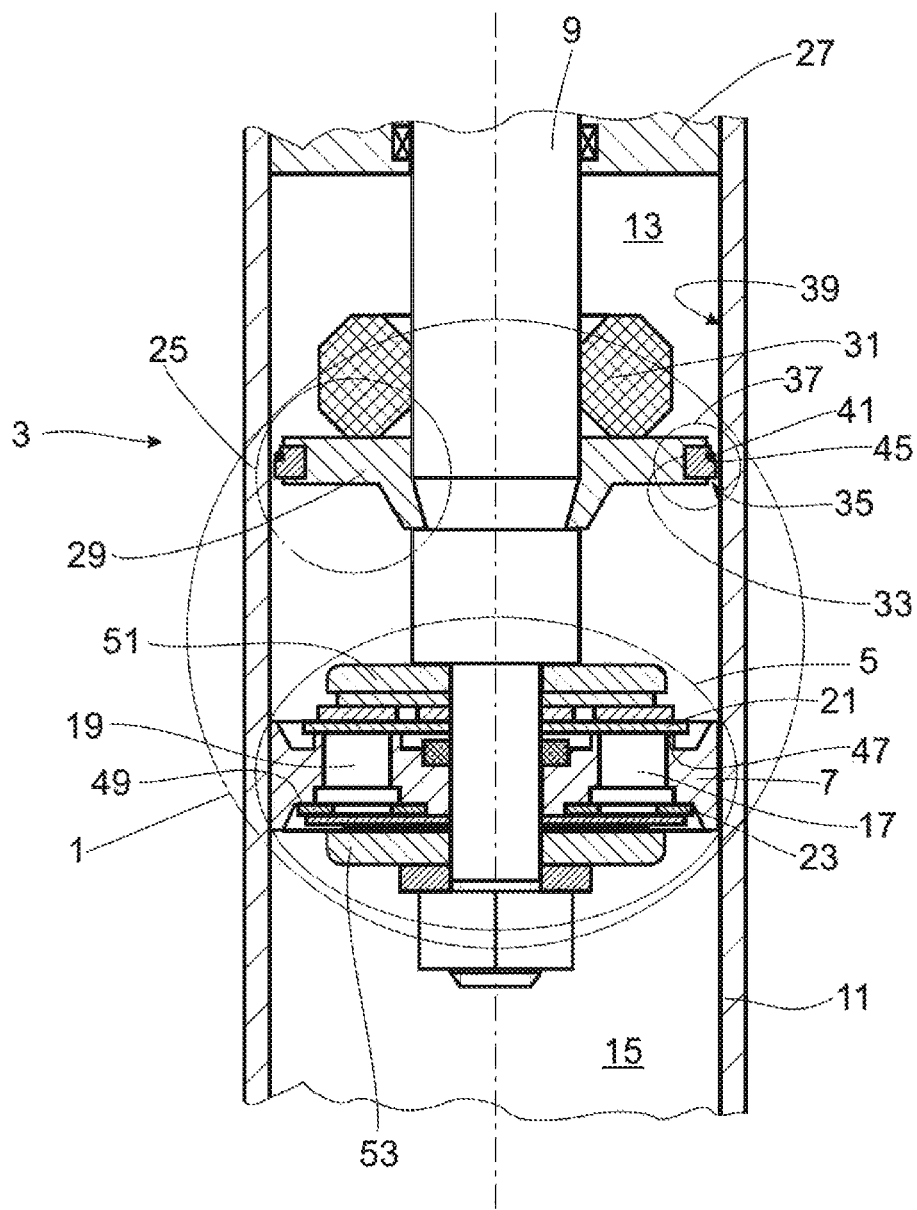
FIG. 1 is a section through a vibration damper in the area of the damping valve device.

FIG. 1 shows a damping valve device 1 for a vibration damper 3 of any constructional type, shown only partially. The damping valve device 1 comprises a first damping valve 5 with a damping valve body constructed as a piston 7 and fastened to a piston rod 9.

The damping valve body 7 divides a cylinder 11 of the vibration damper into a work chamber on the piston rod side and a work chamber remote of the piston rod, both work chambers being filled with damping medium. Through-channels are formed in the damping valve body 7 for a respective throughflow direction on different pitch circles. The configuration of the through-channels is to be regarded as exemplary only. An outlet side of the through-channels 17; 19 is at least partially covered by at least one valve disk 21; 23.

Additionally, the vibration damper has a rebound stop 25 that makes contact with a cylinder-side stop surface, e.g., piston rod guide 27, starting from a defined extension movement of the piston rod 9.

The rebound stop 25 comprises a rebound stop support disk 29 which is directly secured to the piston rod through a positive engagement connection. An annular elastomer element 31, for example, is placed on an upper side of the rebound stop support disk 29 and is held via a slight radial preloading even during an oscillating movement of the piston rod 9. Onward from the stop point at the stop surface, the elastomer element 31 acts as additional supporting spring.

The rebound stop support disk 29 has a circumferential groove 33 in which an annular element 35 with adjustable diameter is guided. This annular element 35 is radially elastic and forms a valve body for a restriction 37 as part of the damping valve device 1. The annular element 35 forms the restriction with an inner wall of cylinder 11, which inner wall 39 forms a flow guiding surface. In principle, the invention can also be formed in a support disk independent from the rebound stop.

The annular element has at the outer side thereof a limiting ring 41, which is constructed, e.g., as a retaining ring.

At a piston rod velocity in a first operating range, e.g., less than 1 m/s, the restriction 37 is completely open. The damping force is then generated only by the through-channels 17; 19 in combination with valve disks 21; 23. With flow impinging on valve disks 21; 23, the valve disks 21; 23 lift from their valve seat surface 47; 49. The lifting movement is limited in each instance by a supporting disk 51; 53.

In a second operating range with a piston rod velocity greater than the limit velocity of the first operating range, i.e., greater than the 1 m/s which was indicated by way of example, the annular element 35 transitions into a restriction position and, in so doing, executes a closing movement in direction of the flow guiding surface 39. As a result of the high flow velocity of the damping medium in the restriction 37 which is shaped as an annular gap, a negative pressure forms leading to a radial expansion of the annular element 35. However, in order to preclude blockage of the restriction 37 the defined minimum cross-sectional opening area of the limiting ring 41 is observed.

Figure 2:
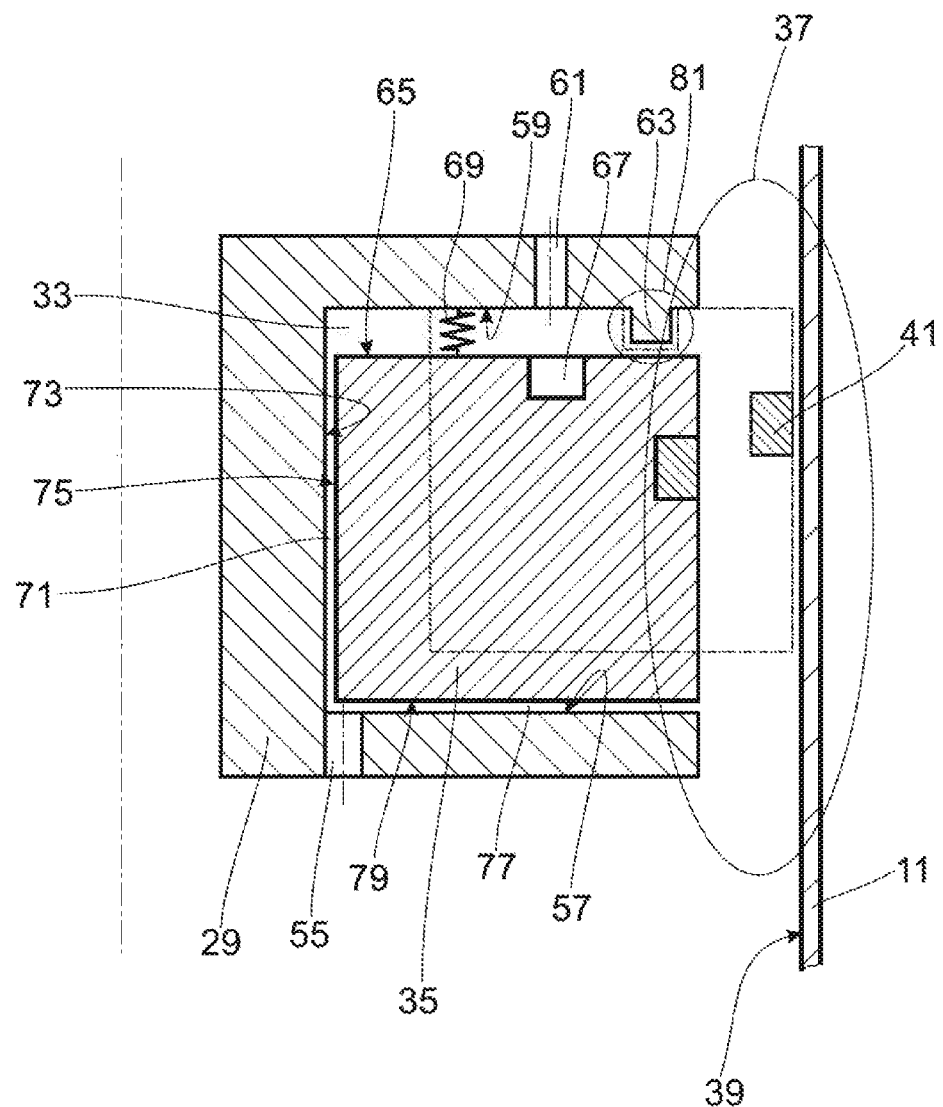
FIGS. 2-5 are the annular element according to FIG. 1.

FIG. 2 shows the radially expandable annular element 35 in the support 29 greatly enlarged and not to scale. The annular element 35 can be radially elastic, for example, due to an elastomer material, or may comprise multiple members with at least one articulated connection. The return movement of the annular element 35 is taken over by the limiting ring 41, particularly in an annular element with articulated connections.

In this simple constructional form, the annular element 35 has a rectangular cross section and the groove 33 is dimensioned somewhat larger in cross section so that the expanding movement of the annular element 35 is not impeded. In the support 29, there is a first connection orifice 55 to a work chamber 13, i.e., the piston rod side work chamber referring to FIG. 1, formed in a first side wall 57 of the groove 33. A second side wall 59 of the groove 33 has a second connection orifice 61 which likewise opens into this work chamber 13.

A stop 63 is formed at the second groove side wall 59 in direction of the first groove side wall 57. This stop 63 can be formed by an individual pin, a plurality of segments or also by an annular web. On a cover side 65 facing in direction of the second groove side wall 59, the annular element 35 has a cutout 67 or, preferably, an annular groove having a cross section that is compatible with the cross section of the stop 63.

A return spring 69 is depicted schematically between the second groove side wall 59 and the cover side 65. The return spring 69 can be formed by a separate component part or can also be part of the annular element. In any case, it provides for a pressure force with a main force component in direction of the first groove side wall 57.

During an inward movement of the piston rod, a negative pressure develops above a defined flow velocity in the restriction 37, which causes a radial expanding movement of the annular element 35. At the same time, the damping medium penetrates into an annular gap 71 between a groove base surface 73 and an inner lateral surface area 75 of the annular element 35 via the first connection orifice 55. Further, there is a second annular gap 77 between the first groove side wall 57 and an opposite second cover side 79 of the annular element 35. This results in a radial force component and an axial force component on the annular element 35. The radial force component reinforces the expanding movement of the annular element 35 in direction of the flow guiding surface or inner wall 39 of the cylinder 11. The axial force component moves the annular element 35 in direction of the second groove side wall 59 against the force of the return spring 69. In the initial position, i.e., at the maximum open position of the annular element 35, the cutout is located radially inward with reference to the stop 63. The annular element 35 displaces during the expanding movement so that the cutout 67 and the stop 63 overlap axially and form a positive engagement connection 81. This positive engagement connection 81 prevents the further radial expanding movement of the annular element 35.

When the flow into the groove 33 decreases, the limiting ring 41 provides for a return force on the annular element 35. However, the return movement is initially inhibited by the positive engagement connection 81. The return movement of the annular element 35 is not initiated until the axial overlap inside of the positive engagement connection 81 is cancelled. The return movement is reinforced by the return spring 69. Further, the return movement is reinforced through an axial incident flow against the annular element 35 via the second connection orifice 61 in that the damping medium flowing into the groove 33 exerts an axial force component on the annular element 35 in direction of the first groove side wall. In this way, the positive engagement connection 81 forms a dead time element which holds the annular element 35 in the maximum restriction position for a longer time than could be accomplished by the flow velocity inside of the restriction 37. This effect is particularly pronounced when there is a reversal of the movement direction of the piston rod. Consequently, the movement of the annular element 35 in direction of the open position is retarded by a dead time element. The dead time can be dimensioned via the axial overlap inside of the positive engagement connection 81.

Figure 3:
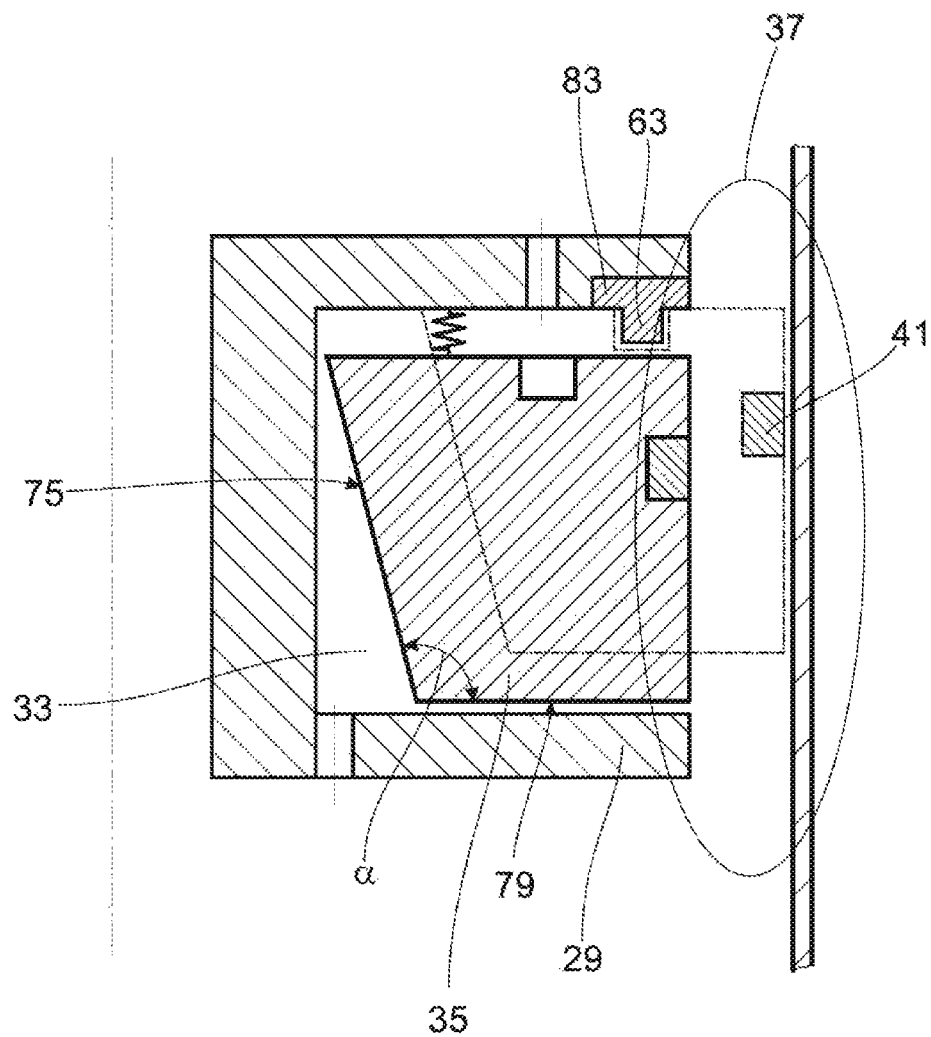

The configuration of the restriction 37 according to FIG. 3 is based on the configuration according to FIG. 2. The rear pressure-impinged inner lateral surface 75 of the annular element 35 additionally has a profile which causes an axial force component on the annular element 35 in addition to a radial force component. The proportion of the axial force component relative to the radial force component can be determined via the angle α formed by the second cover side 79 and the inner lateral surface 75.

Another difference over FIG. 2 is that the support-side portion of the positive engagement connection 63 is formed by an independent component part 83. Component part 83 can be produced separately from the support 29 and inserted, e.g., pressed in, via the open groove 33. The separate component part 83 can be produced very easily and standardized for different applications in order to adapt the dead time function to a particular damping force requirement.

Figure 4:
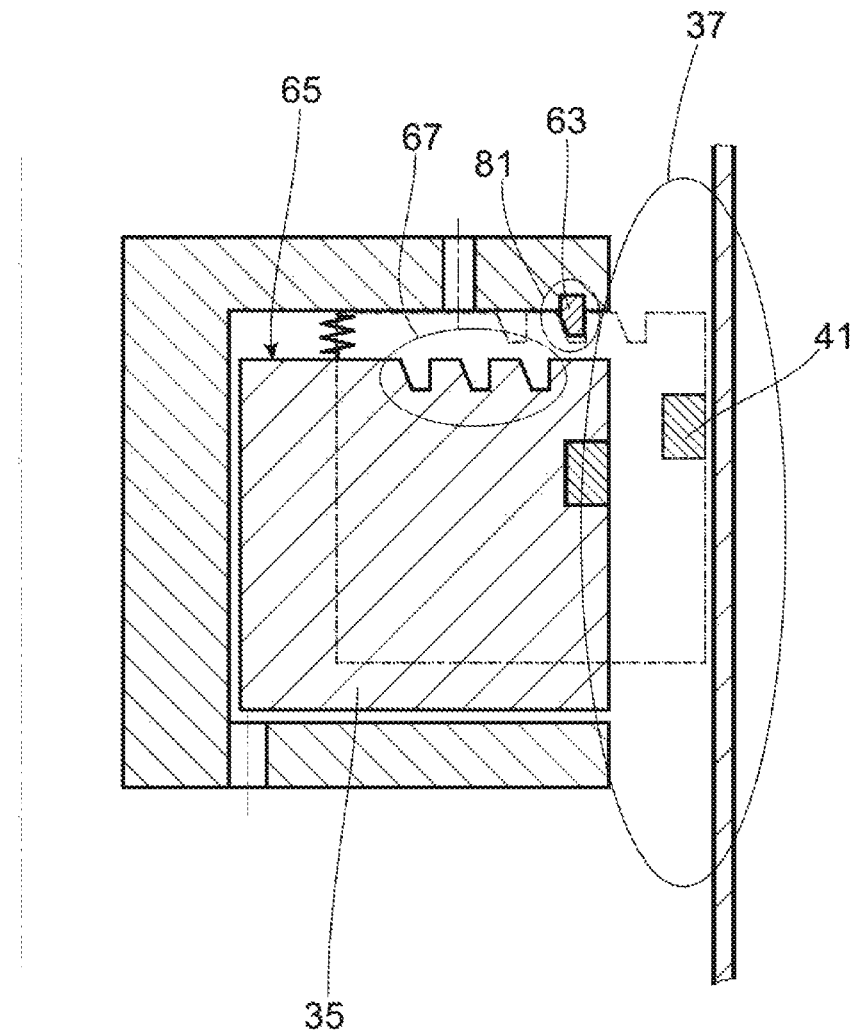

It will be appreciated from the configuration according to FIG. 4 that the restriction 37 can also have a variable dead time element. For this purpose, the positive engagement connection 81 is constructed in multiple steps so that the dead time increases along the connection depth of the positive engagement connection as the restriction function increases. The cover side 65 has a corresponding profile of the cutout 67, the depth of which profile decreases from radially inward to radially outward. Consequently, owing to the smaller axial overlap between the profile 67 and the stop 63, the dead time is shorter when a smaller gap is generated due to the existing flow velocity.

Figure 5:
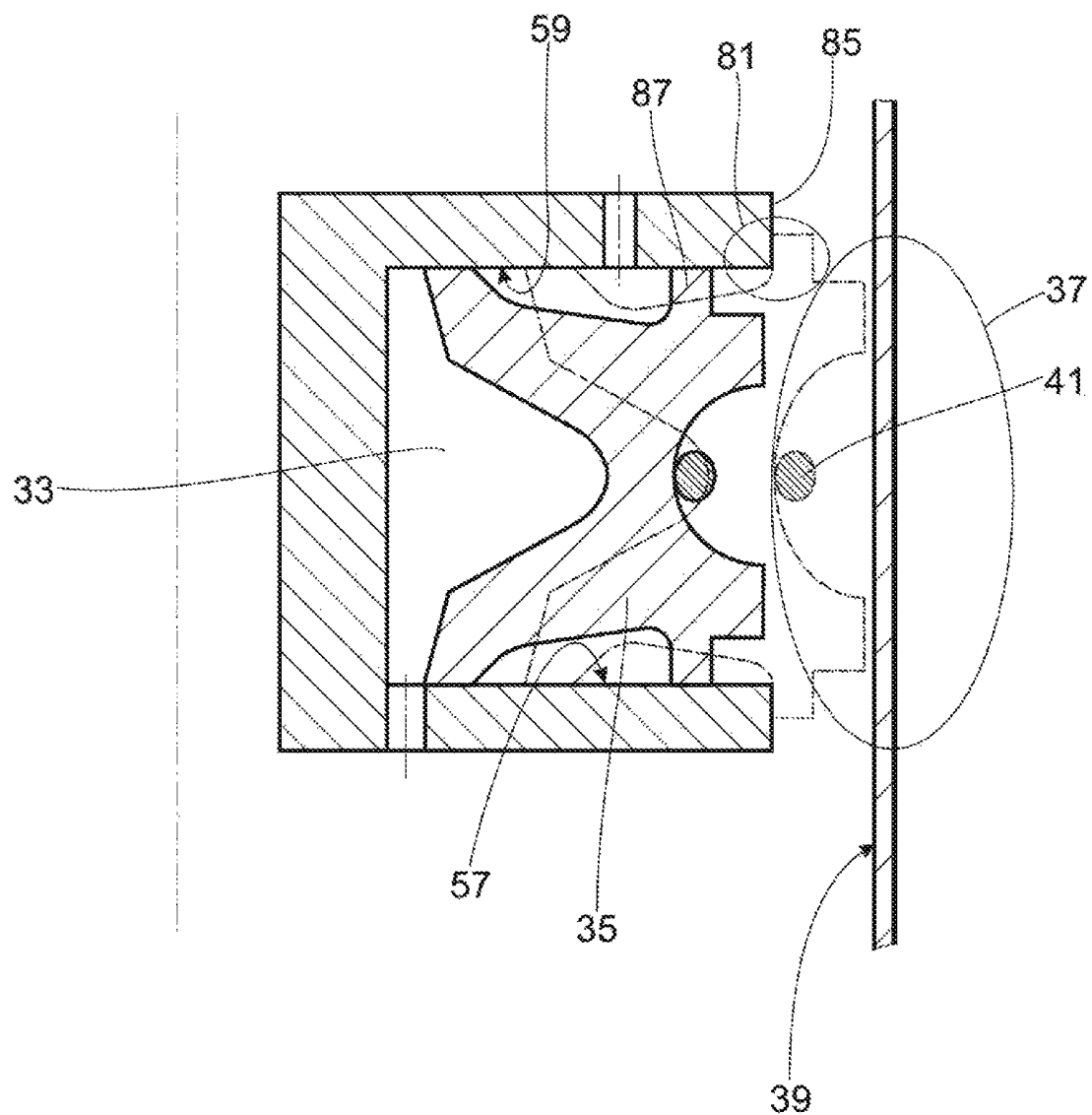

The variant of the damping valve according to FIG. 5 differs from the preceding versions in that at least one radial outer surface 85 of the support 29 forms the positive engagement connection 81 with at least one axial projection 87 of the annular element 35. A simple groove geometry can be observed in this way. In the initial position, i.e., the maximum open position with maximum width of the gap, the axial projection 87 of the annular element is located inside of the groove 33 and contacts the groove side wall 57; 59. When the flow conditions for the restriction effect are met, the annular element 35 moves radially outward in direction of the flow guiding surface 39. In this way, the annular element 35 and the radial projection 87 connected to the latter can execute an axial movement outside of groove 33 initiated by a self-preloading. The self-preloading is reinforced in that the annular element 35 is constructed to be axially elastic. The projection 87 could also simply be constructed to be elastic or mounted to be elastically movable.

By the second connection orifice 61, all of the variants offer the possibility for an axial pressure force to be exerted on the annular element 35 when there is a flow of damping medium against the latter via this connection orifice 61. This pressure force reinforces the force of the return spring 69. The larger the selected cross section of the second connection orifice 61, the smaller the pressure drop and, correspondingly, the greater the pressure level in the groove 33 for axial displacement of the annular element 35 inside of the groove 33. The dead time behavior of the restriction 37 can also be influenced via the dimensioning of the cross section.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve device, comprising:
    an annular element that is radially expandable;
    a support with a circumferential groove in which the annular element together with a flow guiding surface forms a restriction,
    wherein the restriction transitions from an open position to a restriction position depending on a flow velocity of a damping medium, and
    a stop determines, at least in part, a maximum expansion position of the annular element
    wherein the annular element moves in direction of the open position with a delay when the flow velocity decreases by a dead time element,
    wherein a positive engagement connection is closable as dead time element between the annular element and a support-side element,
    wherein the positive engagement connection is formed in multiple steps so that dead time increases over a connection depth of the positive engagement connection with increasing restriction function.

2. The damping valve device according to claim 1, wherein a rear surface of the annular element that is acted upon by pressure has a profile that causes an axial force component and a radial force component on the annular element.

3. The damping valve device according to claim 1, wherein the annular element executes an axial movement to close the positive engagement connection.

4. The damping valve device according to claim 1, wherein a support-side portion of the positive engagement connection is formed by an independent component part.

5. The damping valve device according to claim 1, wherein the annular element is axially elastic.

6. A damping valve device, comprising:
    an annular element that is radially expandable;
    a support with a circumferential groove in which the annular element together with a flow guiding surface forms a restriction,
    wherein the restriction transitions from an open position to a restriction position depending on a flow velocity of a damping medium, and
    a stop determines, at least in part, a maximum expansion position of the annular element
    wherein the annular element moves in direction of the open position with a delay when the flow velocity decreases by a dead time element,
    wherein a positive engagement connection is closable as dead time element between the annular element and a support-side element,
    wherein at least one return spring preloads the annular element out of the positive engagement connection.

7. The damping valve device according to claim 6, wherein the annular element is axially elastic.

8. The damping valve device according to claim 6, wherein a rear surface of the annular element that is acted upon by pressure has a profile that causes an axial force component and a radial force component on the annular element.

9. The damping valve device according to claim 6, wherein the annular element executes an axial movement to close the positive engagement connection.

10. The damping valve device according to claim 6, wherein a support-side portion of the positive engagement connection is formed by an independent component part.

11. A damping valve device, comprising:
    an annular element that is radially expandable;
    a support with a circumferential groove in which the annular element together with a flow guiding surface forms a restriction,
    wherein the restriction transitions from an open position to a restriction position depending on a flow velocity of a damping medium, and
    a stop determines, at least in part, a maximum expansion position of the annular element wherein the annular element moves in direction of the open position with a delay when the flow velocity decreases by a dead time element, wherein a positive engagement connection is closable as dead time element between the annular element and a support-side element, wherein at least one radial outer surface of the support forms the positive engagement connection with at least one axial projection of the annular element.

12. The damping valve device according to claim 11, wherein the annular element is axially elastic.

13. The damping valve device according to claim 11, wherein a rear surface of the annular element that is acted upon by pressure has a profile that causes an axial force component and a radial force component on the annular element.

14. The damping valve device according to claim 11, wherein the annular element executes an axial movement to close the positive engagement connection.

15. The damping valve device according to claim 11, wherein a support-side portion of the positive engagement connection is formed by an independent component part.

\* \* \* \* \*